INVENTORS
WILLIAM E. HARDING
JOHN A. PERRI
JACOB RISEMAN
WINFIELD S. RUDER
BY Joseph C. Redmond, Jr.
ATTORNEY

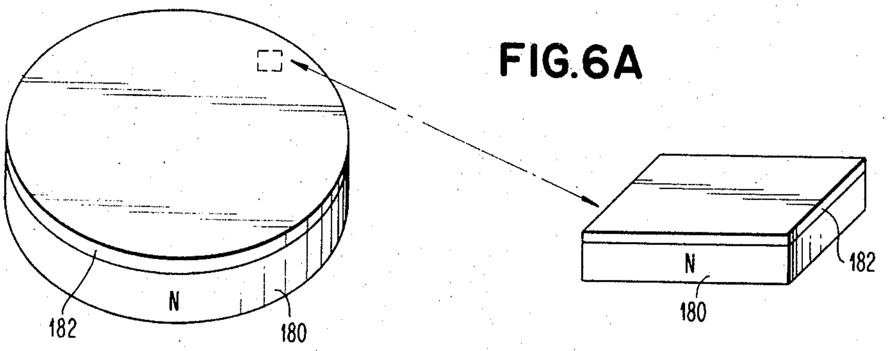
FIG. 6A
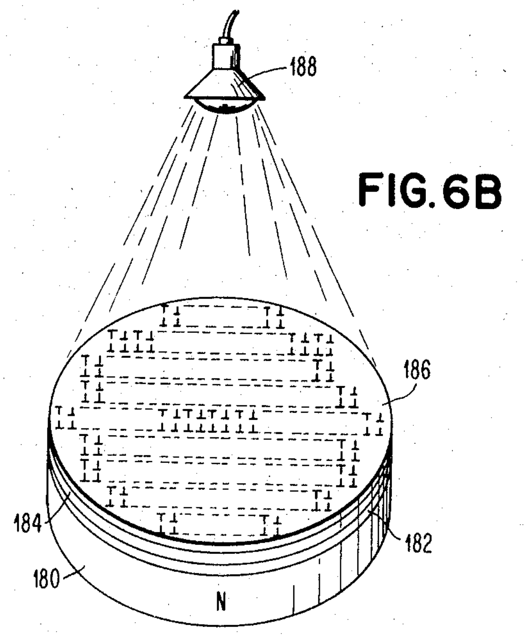
FIG. 6B
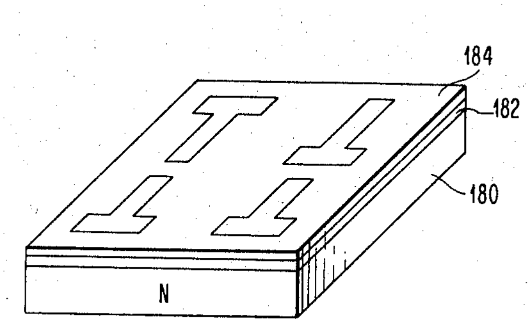
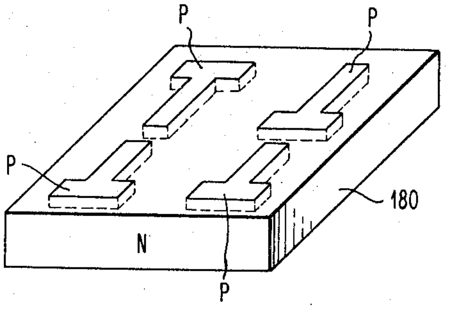
FIG. 6C FIG. 6D

United States Patent Office 3,449,049
Patented June 10, 1969

3,449,049
HIGH RESOLUTION MULTIPLE IMAGE CAMERA AND METHOD OF FABRICATING INTEGRATED CIRCUIT MASKS

William E. Harding, John A. Perri, and Jacob Riseman, Poughkeepsie, and Winfield S. Ruder, Wappingers Falls, N.Y., assignors to International Business Machines Corporation, Armonk, N.Y., a corporation of New York
Filed Jan. 14, 1966, Ser. No. 520,582
Int. Cl. G03b 27/42
U.S. Cl. 355—53 6 Claims

ABSTRACT OF THE DISCLOSURE

A method for photocopying a plurality of individual images by projection thereof on a photosensitive element through a lens whose relative position to the element is relocated for recording successive images on separate segments of the photosensitive element.

This invention relates to photographic apparatus. More particularly, this invention relates to multiple image photographic apparatus and methods for fabricating photolithographic masks necessary to manufacture semiconductor devices.

The fabrication of semiconductor devices requires a plurality of photolithographic masks of precise geometry. The masks are successively registered with a semiconductor member to establish patterns in the member definitive of the electrodes of a plurality of discrete devices. One apparatus for fabricating masks of this description is described in a previously filed application Ser. No. 467,159, filed May 4, 1965, now abandoned, and assigned to the same assignee as that of the present invention. The aforementioned application was abandoned after the filing of a continuation application, now U.S. Patent No. 3,288,045. These masks permit the fabrication of approximately 1100 discrete transistors in a semiconductor wafer of approximately 1¼ inches in diameter. A lenticulated lens divides the mask into 1100 discrete cells. The lens permits a single pattern to be reproduced in each of the discrete cells.

It is now desired, however, to fabricate masks which establish approximately 33000 discrete semiconductor devices in a 1¼ inch wafer or 30 times more than the number of devices presently possible with masks fabricated by apparatus of the type described in the previously filed application.

A lenticulated lens provides a relatively small area of good resolution about the optical axis of each unit cell. The resolution in the remainder of the cell is essentially unusable to produce a mask of required definition. The good resolution area is satisfactory for several devices, but unsatisfactory for approximately 30 devices which are required for each unit cell. It is imperative, therefore, to expand the good or high resolution area of each individual cell to increase the density of semiconductor devices in each cell. This increased device density is necessary for the formation of monolithic or integrated circuit devices, described, for example, in the IBM Technical Disclosure Bulletin, vol. 6, No. 6, July 1963, page 91. Integrated circuit devices shorten the signal transmission path between logic stages which improves the speed in data handling rates of information handling systems. Integrated circuits are expected to find increasing use in present and future information handling systems.

A general object of the present invention is multiple image photographic apparatus having expanded high resolution capability.

Another object is multiple image photographic apparatus having controlled relative movement between a lens system and a photographic plate.

Another object is apparatus for generating registrable masks useful in fabricating integrated circuits.

Another object is apparatus for positioning one object relative to another object within microinches.

Another object is apparatus for reliably reproducing relative movement between two objects.

Another object is a method for fabricating registrable masks useful in the manufacture of integrated circuits.

These and other objects and features are accomplished in accordance with the present invention, one illustrative embodiment of which comprises a light box for displaying a pattern desired to be reproduced in a plurality of locations in a mask. Cooperating with the light box is a multiple image camera which may be controllably positioned relative to the light box. The camera includes a stepping plate which holds a lens system, typically a lenticulated lens, relative to a photographic plate. A three-dimensional control system regulates the positioning of the stepping plate relative to the photographic plate. Included in the control system are air cylinders (X+, X−, Y+, Y− and Z) for precisely positioning the stepping plate in X, Y and Z planes. The air cylinders act against push bars which are symmetrically disposed about the stepping plate. The X and Y push bars act against two sets of eccentrics or stops which cooperate with guide blocks included in the stepping plate. The eccentrics or stops hold the stepping plate in four precise positions in the X and Y plane according to the air cylinders that are operated. A stop and spring bias member controls the movement of the stepping plate in the Z direction. A series of probe members are located in the X, Y and Z planes to determine accurately the location of the stepping plate. The air cylinders can control the movement of the stepping plate against the stops to within 30 microinches. For accuracy better than 30 microinches, additional air pressure can be supplied to the air cylinders. The push bars, associated with the overdriven air cylinders, deform the eccentric cams to permit positioning of the stepping plate to within 5 microinches. The micrometer probes in conjunction with the control system permit the stepping plate motion to be reliably reproduced.

The stepping plate is also controlled to urge the lens against the photographic plate. The positive contact between the lens and the photographic plate insures reproducibility of the pattern. An air gap existing between the stepping plate and the photographic plate would introduce the possibility of distortion in the image.

In operation, a pattern is disposed on the light table and a single photographic plate loaded in the camera. The stepping plate and lenticular lens are shifted successively to four discrete positions. The shifting locates the high resolution area of the individual lens in four overlapping positions in each cell. At each discrete position a unique pattern is disposed on the light table and recorded in the photographic plate which is not changed during shifting. Thus, four images are recorded at a plurality of discrete locations in the photographic plate corresponding to the individual lens in the lenticular array. The photographic plate is developed as a mask for semiconductor fabrication.

The preparation of an integrated circuit mask comprises the steps of loading a photographic plate into the multiple image camera and disposing the pattern on the light box. A lenticular lens is positioned in the stepping plate. Each lens in the array is associated with a discrete area or unit cell in the photograph plate. Each cell may be further divided into four quadrants. The stepping plate is adapted to be shifted and the optical axis of the individual lens located in the geometric center of each quadrant. The high resolution area of each lens, therefore, is expanded by approximately 4 times within each cell and occupies the major portion thereof.

After loading, the stepping plate is shifted by X+ and Y− air cylinders to locate the optical axes in the first quadrant of each unit cell. The X and Y probes are read to verify the location of the optical axis as being in the center of the quadrant. The lens is raised to engage the photographic plate by means of the Z air cylinder. The X, Y and Z probes are read for final lens position. The camera is operated to shoot the picture and the Z cylinders released to lower the lens.

A second pattern is positioned on the light box. The stepping plate is shifted to establish the optical axis in the second quadrant. The probes are read. The lens is raised to be in contact with the photograph plate. The probes are read for final lens position and the camera is operated. The lens is released which is followed by replacing the pattern. The previously described process is repeated for the third and fourth quadrant position.

The photograph plate, after the four shootings, has all four patterns recorded in each unit cell. The photograph plate is developed and a mask fabricated according to well established practice. Where more than one mask is required, the camera may be adapted to permit registration of the masks as described in the IBM Journal of Research and Development, April 1963, pages 146 through 150.

The mask is employed in fabricating semiconductor devices as described in U.S. Patent 3,122,817 to J. Andrus, Briefly, a semiconductor is coated with silicon dioxide which is covered by a photoresist. The mask, fabricated by the present invention, is disposed between a light source and the resist-coated semiconductor member. The resist is exposed and developed. The undeveloped resist under the pattern is removed to expose the silicon dioxide. An etchant is employed to remove the exposed silicon dioxide. The etch does not attack the developed photoresist. The semiconductor wafer is exposed in those areas where the etch attacks the silicon dioxide. The wafer is cleaned of all impurities and photoresist and subjected to a diffusion process whereby the exposed silicon is converted to a particular conductivity type to establish the various electrodes for the integrated circuit.

One feature of the present invention is a symmetrical configuration of pneumatically operated push bars which cooperate with eccentrics or stops to control precisely the position of a stepping plate relative to a photograph plate.

Another feature is a set of eccentric members capable of elastic deformation for providing movement of the order of microinches to a stepping plate relative to a photograph plate.

Another feature is a pneumatic system for rectilinear movement of a stepping plate relative to a photograph plate, the pneumatic system being adapted to develop excess air pressure for moving the stepping plate distances of the order of microinches.

Another feature is the use of linear differential transformer probes for determining the precise position of a stepping plate relative to a photograph plate.

Another feature is apparatus for engaging and disengaging a lens array and photographic plates to permit precise relative movement therebetween.

Another feature is a stepping plate and push bar which cooperate with a plurality of barrel-shaped eccentrics, the stepping plate and push bar having a greater hardness than the eccentric whereby in the presence of compression the eccentric will deform a precise amount.

Still another feature is a stepping plate having guide block portions, each guide block cooperating with a set of eccentrics and pneumatically operated push bars, the pneumatically operated push bars controlling the stepping plate in X and Y directions for coarse movement of the stepping plate and the barrel-shaped eccentrics controlling the vernier movement of the stepping plate by deformation as a result of excess air pressure applied to the pneumatically operated push bars.

Still another feature is a set of pneumatically operated push bars, a stop member and a spring biased member for controlling movement of a stepping plate toward and away from a photographic plate, the stop member limiting the movement of the stepping plate towards the photographic plate and the spring biased member returning the stepping plate to a positioned space from the photograph plate when the push bars are deconditioned.

The foregoing and other objects, features and advantages of the invention will be apparent from the following more particular description of preferred embodiments of the invention, as illustrated in the accompanying drawings.

FIGURES 6A through 6D show the various steps in fabricating integrated circuit devices by mask prepared by the apparatus of FIGURE 2.

Figure 1B:
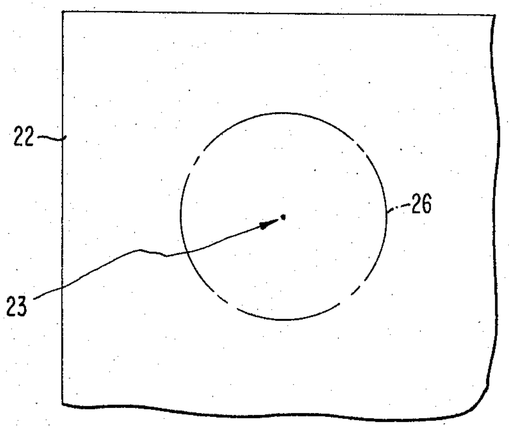
FIGURES 1B and 1C show a plan view of a high resolution area associated with a lens and the movement of the area to expand the resolution in a unit cell.
Figure 1A:
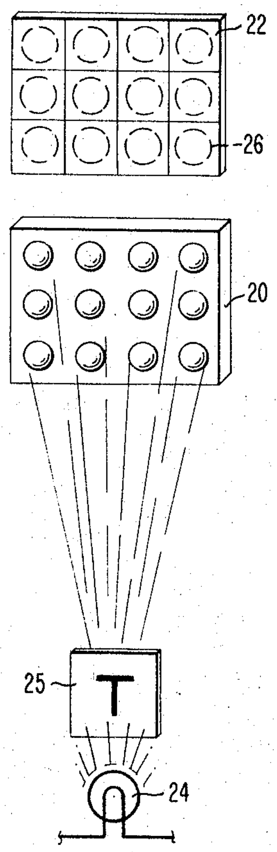
FIGURE 1A shows a schematic view of a multiple image camera.

FIGURE 1A shows a lenticular lens 20, a conventional photographic plate 22 and an optical axis 23 associated with each of the individual lenses as a result of light emanating from source 24. The lens 20 in one form may be fabricated in the manner described in the previously filed application Ser. No. 467,159. A pattern 25 positioned between the light source 24 and the lens 20 will be reproduced by each lens included in the array 20. The pattern is descriptive of a semiconductor device electrode desired to be established in a semiconductor member (not shown). The high resolution area associated with each optical axis is indicated by circle 26 shown in FIGURE 1B. The square enclosing the circle is the coverage associated with each of the lenses in the array 20 (FIGURE 1A). This square shall be referred to hereinafter as a unit cell. Although the unit cell is shown as square, it is apparent that the geometric form may be any other configuration. The coverage of each unit cell is approximately 30 mils square. The high resolution area for semiconductor mask fabrication is only about 13% of the unit cell, a relatively small portion thereof. Patterns outside the high resolution area are not sufficiently definitive to permit the formation of uniformly reproducible device electrodes throughout a semiconductor member. The number of devices which may be established within the high resolution area, therefore, is limited.

Figure 1C:
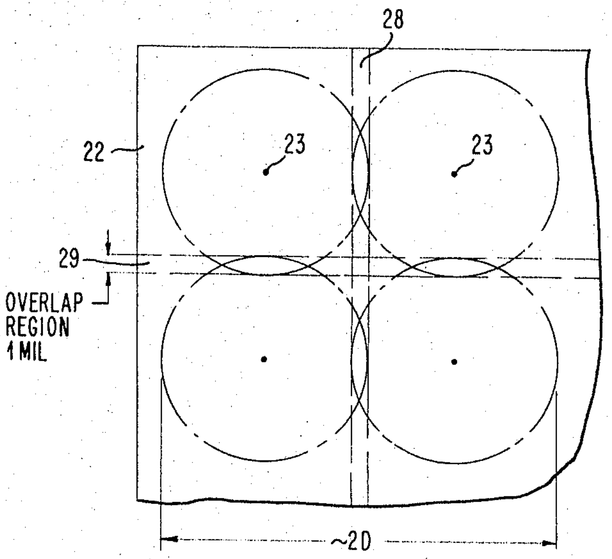

Integrated circuit devices, as previously described, require a density of patterns within the high resolution area approximately 30 times greater than can be presently permitted. To achieve such a density, the present invention increases the high resolution area associated with each lens by relative movement between the lens 20 (FIGURE 1A) and the plate 22, as shown in FIGURE 1C. Alternatively, the plate 22 could be moved relative to the lens 20, if so desired. The relative movement expands the high resolution area nearly 400% in each unit cell. The high resolution areas overlap in sections 28 and 29. These sections are not useful for device patterns, but they are useful for circuit conductor patterns which interlink the semiconductor devices. The apparatus for expanding the high resolution area of a lenticular lens and the method of mask fabrication with the apparatus will now be described.

Figures 2, 8:
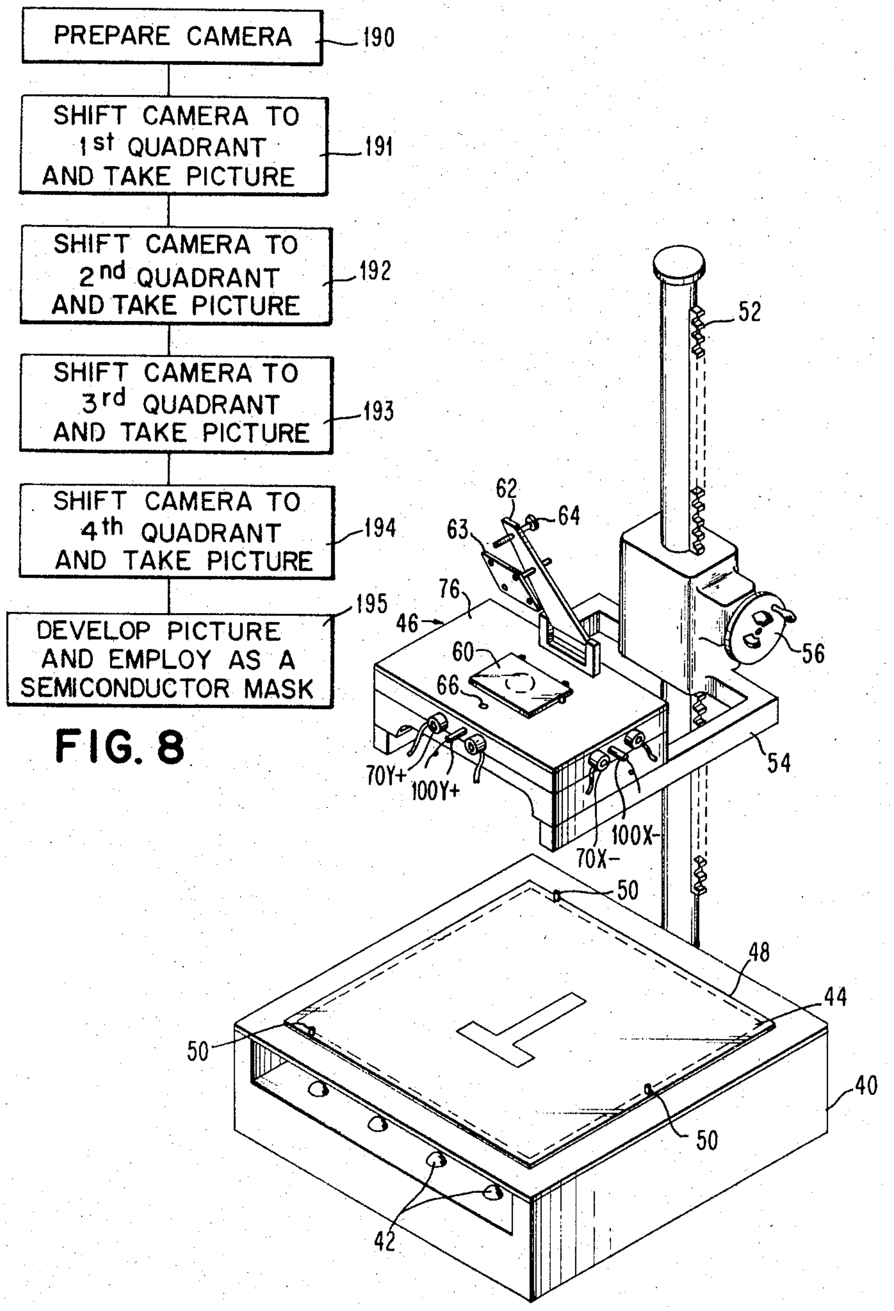
FIGURE 2 is a perspective view of a high resolution multiple image camera employing the principles of the present invention.
FIGURE 8 is a flow diagram of the steps employed in the present invention in fabricating a mask.

Turning to FIGURE 2, a high resolution multiple image photographic apparatus includes a light box 40 in which are located a series of light sources 42 which are connected to a source of power and switching means (not shown). The light box further includes a glassed area 44 for directing light towards a multiple image camera 46. A pattern 48 is superposed over the glass area 44 and held in position by registration pins 50. A rack 52 is suitably attached to the light box. The camera 46 is secured to a travelling member 54 which is adapted through a handwheel 56 to position the camera 46 vertically with respect to the light box 40. The wheel 56 controls suitable gears (not shown) which engage tooth members on the rack for relative movement between the travelling member 54 and the rack 52. A photographic plate 60 is held in the camera by a flap 62 and a pressure plate 63. The flap includes a threaded member 64 which is tightened into a tapped hole 66 located in a top plate 76. Air cylinders 70X+, 70Y− and corresponding probes 100Y+ and 100X− are located along all sides and underneath the camera, as will be explained in more detail hereinafter.

Figure 3C:
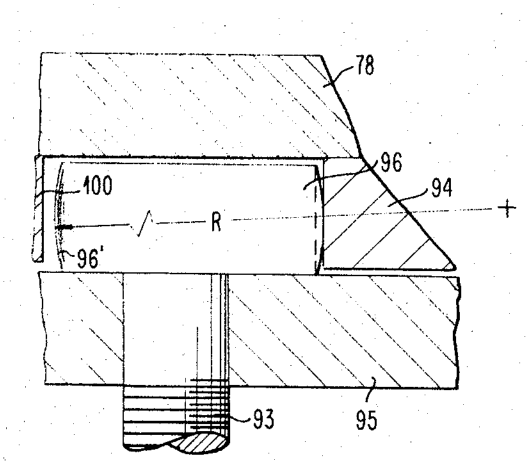
FIGURE 3C is a schematic view of an eccentic and stepping plate included in the apparatus of FIGURES 3A and 3B.
Figure 3D:
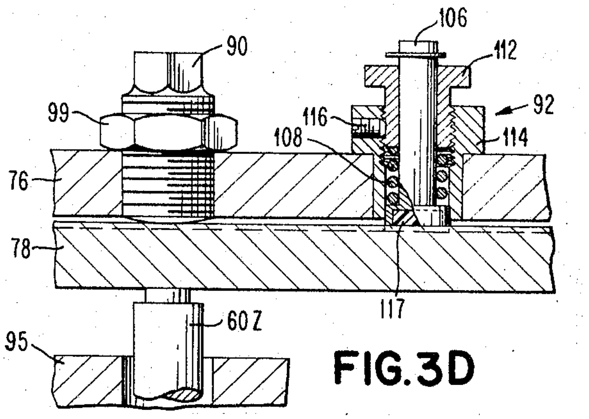
FIGURE 3D is a side view of a camera section shown in FIGURES 3A and 3B.
Figure 3A:
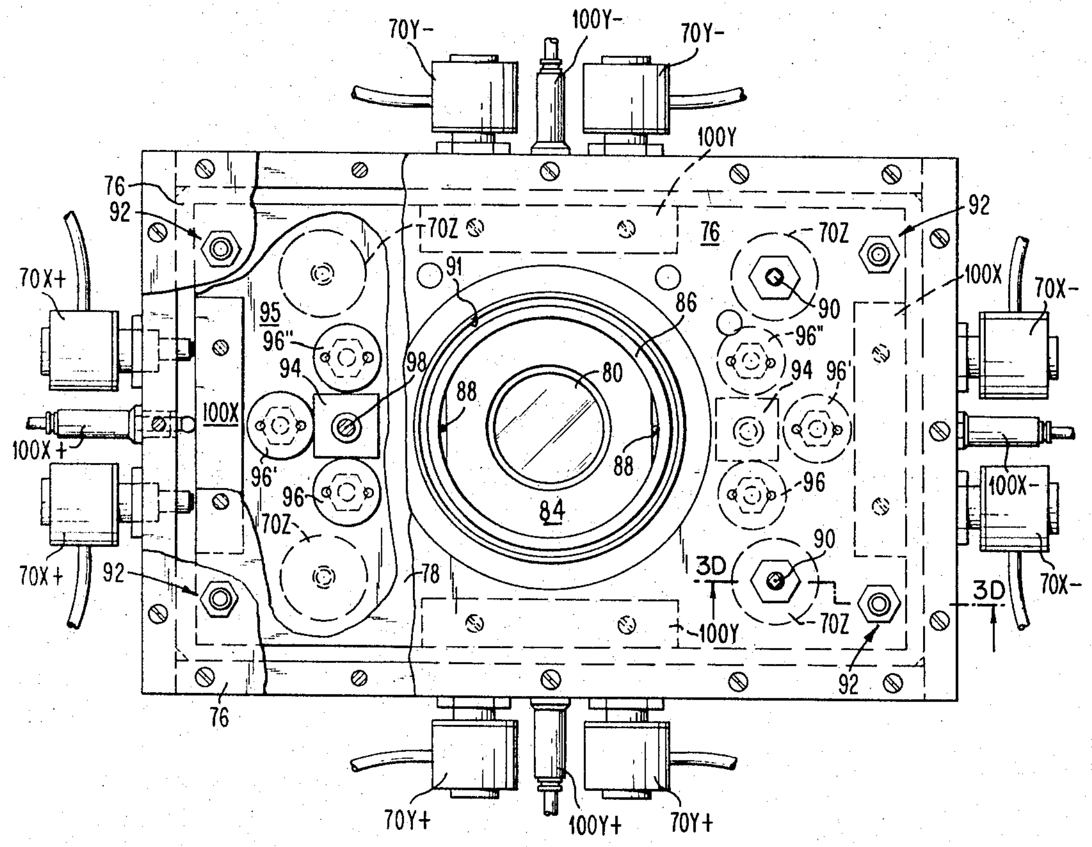
FIGURE 3A is a top view, broken away, of the camera portion of the apparatus shown in FIGURE 2.
Figure 3B:
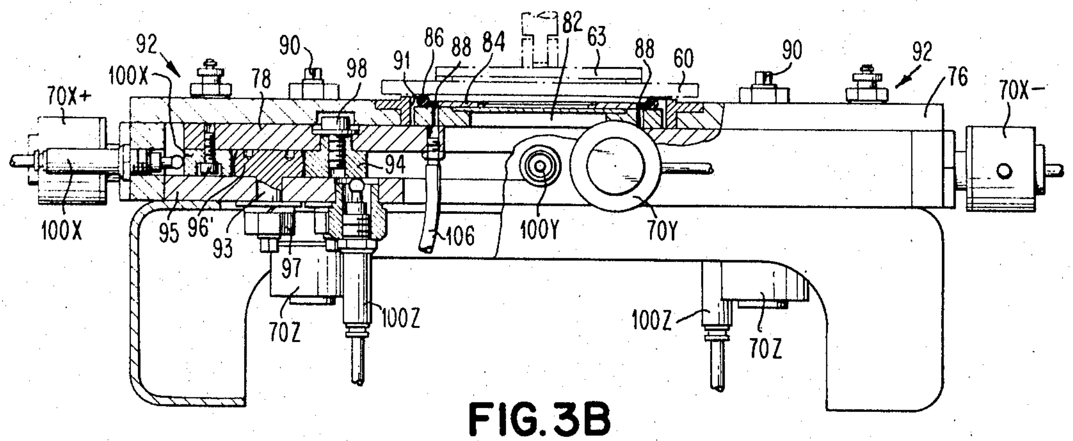
FIGURE 3B is a side view, broken away, of the camera portion of the apparatus shown in FIGURE 2.

The camera 46 is shown, broken away, in FIGURE 3A with a portion of top plate 76 and stepping plate 78. A bottom plate 95 and side walls 93 are also shown. A lens 80, typically a lenticular lens, is positioned in the stepping plate. Turning to FIGURE 3B, the lens is disposed in an aperture 82 and held in place by a locking ring 84. Surrounding the locking ring is a diaphragm 86, typically an O-ring, which is contacted by the photograph plate 60. The pressure plate and flap member hold the photograph plate in position, as previously described in connection with FIGURE 2. Between the locking plate 84 and the diaphragm 86 are openings 88 to permit a vacuum to be applied across the photograph plate 60. The vacuum plate holds the photograph plate in a single plane. FIGURE 3B further discloses a vacuum connection 106. The connection applies a vacuum to the space between the O-ring 86 and the locking plate 84 which holds the lens assembly on the stepping plate. The stepping plate is movable toward and from the photograph plate. Returning to FIGURE 3A, the stepping plate, in one form, includes guide blocks 94 which engage eccentric members 96, 96′ and 96″. The guide blocks are mounted on the lower side of the stepping plate by a screw member 98. The eccentrics (see FIGURE 3B) are also mounted beneath the stepping plate and engage the guide blocks. Push bars 100X and 100Y are also secured to the lower side of the stepping plate. The push bars are engaged by air cylinders 70X+, X−, 70Y+ and Y− for shifting the stepping plate in the X and Y directions. The air cylinders are conventional apparatus, as for example those manufactured by Airmatic Valve Co., Cleveland, Ohio. Measurement devices 100X−, X+, Y−, Y+ and Z, typically linear differential transformer probes, similar to those manufactured by Sheffield Corp., Dayton, Ohio, Cat. No. 59230108, Class XX, determine the position of the stepping plate in the X, Y and Z directions.

The eccentric cams 96, shown in FIGURE 3C, are arcuate or barrel-shaped. The barrel configuration provides a means, within the elastic limit of the cam material, which will permit stepping plate movement over a relatively wide range, in the order of microinches, without permanently deforming or otherwise damaging the cam surface, as will be described hereinafter. The eccentrics are standard hardened stainless steel, cutlery grade 416 or equivalent. The push bars 100 and guide blocks 94 are made of tungsten carbide steel to prevent permanent deformation or damage to their faying surfaces. The eccentrics are adjustable with respect to the square rectangular blocks. Each eccentric has a shank 93 which extends through a reamed hole in the base plate 95 to provide a means for externally adjusting the eccentric position after assembly of the camera body. A nut 97 is threaded on to the end of the shank 93. The nut 97 (see FIGURE 3B) provides a means for locking the eccentric in position after an adjustment is made to the cam. Using the linear differential transformer probes, the clearance between the cam and the rectangular block can be precisely regulated externally, in the order of microinches, after assembly of the camera body by rotation of the shaft 93. Although only a single eccentic adjustment has been described, it is apparent that the other eccentrics are adjustable in a like manner.

A stop member 90 and spring biased members 92, shown in more detail in FIGURE 3D, cooperate with air cylinders 70Z in controlling the movement of the stepping plate 78 in the vertical or Z direction. The spring biased member 92 includes a plunger 106 which is in contact with the stepping plate 78. Normally, the stepping plate is held away from the stop 90 by the pressure exerted by the spring biased member 92. A spring 108 encloses the shaft of the plunger and is held at one end by the plunger lip. The other end of the spring is held by a bushing 112 which threads into a collar 114 secured in a tapped hole located in the top plate 76. The tension on the spring can be increased by threading the bushing 112 further into the threaded collar 114. A set screw 116 located in the collar is adapted to hold the bushing from further movement. A Teflon insert 117 in the plunger reduces friction during X and Y stepping.

The stop member 90 comprises a threaded shaft which is rotated into a tap hole located in the upper plate 76. The member 90 may be locked in position by a nut 99. The distance the member 90 extends beyond the upper plate controls the height to which the stepping plate will rise when urged by the air cylinders 70Z. This clearance is sufficient to prevent the lens from being scratched by the photographic plate, when relative movement therebetween occurs.

Figures 4, 4A:
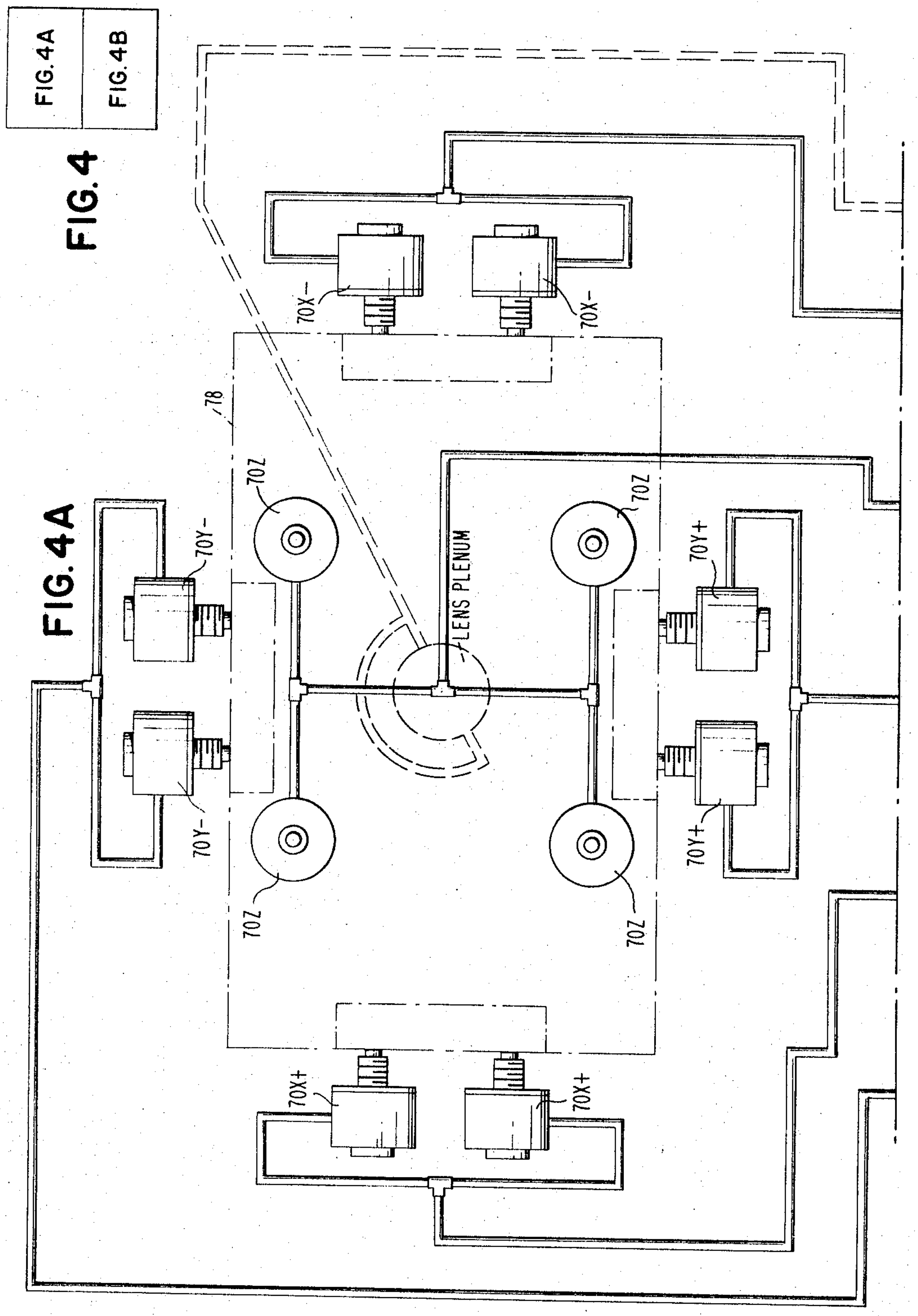
FIGURE 4 is a block layout of a pneumatic system.
FIGURES 4A and 4B are schematics of the pneumatic system employed in the present invention.

Turning to FIGURE 4, a layout indicates the figures which describe the pneumatic system for controlling air cylinders 70X+, X−, Y+, Y− and Z (see FIGURE 3B). The air cylinders 70X+, shown in FIGURE 4A, are connected through suitable tubings to a solenoid valve V2, shown in FIGURE 4B. The valve V2 is of conventional construction and is similar to that manufactured by Clippard Instrument Co., Cincinnati, Ohio. The valve V2 is adapted to vent the air pressure to the atmosphere and is also connected to a conventional double check valve CV2. The valve CV2 is connected to a manual control valve V8 similar to that manufactured by Clippard Instrument Co. The valve CV2 is further connected through suitable tubing and reducing valves 114 and 136, an air filter 118 to an air supply 134. The valve V8 is also connected through suitable tubing to the high pressure side of reducing valve 136. The valve V8 permits the air pressure from the reducing valve 114 to be supplemented with higher pressure for overdriving the air cylinders 70X+, as will be described in more detail hereinafter.

Air cylinders 70X− are connected through suitable tubing to solenoidal valve V5 which vents to the atmosphere and is also connected to double check valve CV5. A manual control valve V11 connected to the valve CV5 is adapted to provide excess air pressure in the manner described for valve V8 to the valve V5. The air cylinders 70Y+ and 70Y− are individually connected to solenoidal control valves V3 and V1, respectively. The valves V1 and V3 cooperate with double check valve CV1 and CV3 and manual control valves V7 and V9, respectively. The remaining air cylinders which control the Z direction of motion are four in number, in one form, and, as previously indicated, are designated 70Z. These air cylinders are controlled by solenoid and manual control valves V4 and V10, respectively. The valve V4 is supplied from a reducing valve 132 instead of 114 which provides the air for the air cylinders 70X and 70Y. The reducing valve 132 is connected to the same source 134 that is connected to the valve 114. Hence, the same air pressure flows to all Z air cylinders as flows to the X and Y cylinders.

The discharge side of reducer 136 is also connected through a reducer 140 to solenoidal control valve V6 and needle valve V12. The valve V6 is connected in the vacuum system which is adapted to hold the photographic plate in a plane as described in connection with FIGURES 3A and 3B. A vacuum pump (not shown) connected to the valve V6 is of conventional construction and is adapted to provide a vacuum of at least 15 inches of mercury.

The air supply, in one form, provides an output about 100 lb. The reducing valve 136 lowers it to about 50 lb. The reducing valves 114 and 132 further lower this to 25 lb. The 25 lb. air pressure to the air cylinders may be supplemented by operation of the manual control valves V7, V8, V9, V10 and V11, respectively. These valves provide up to 50 lb. additional pressure to the intake to valves V1, V2, V3, V4 and V5, respectively. The additional air pressure supplied to the air cylinders will cause additional movement of the stepping plate 78 described in connection with FIGURES 3A and 3B.

Figure 4B:
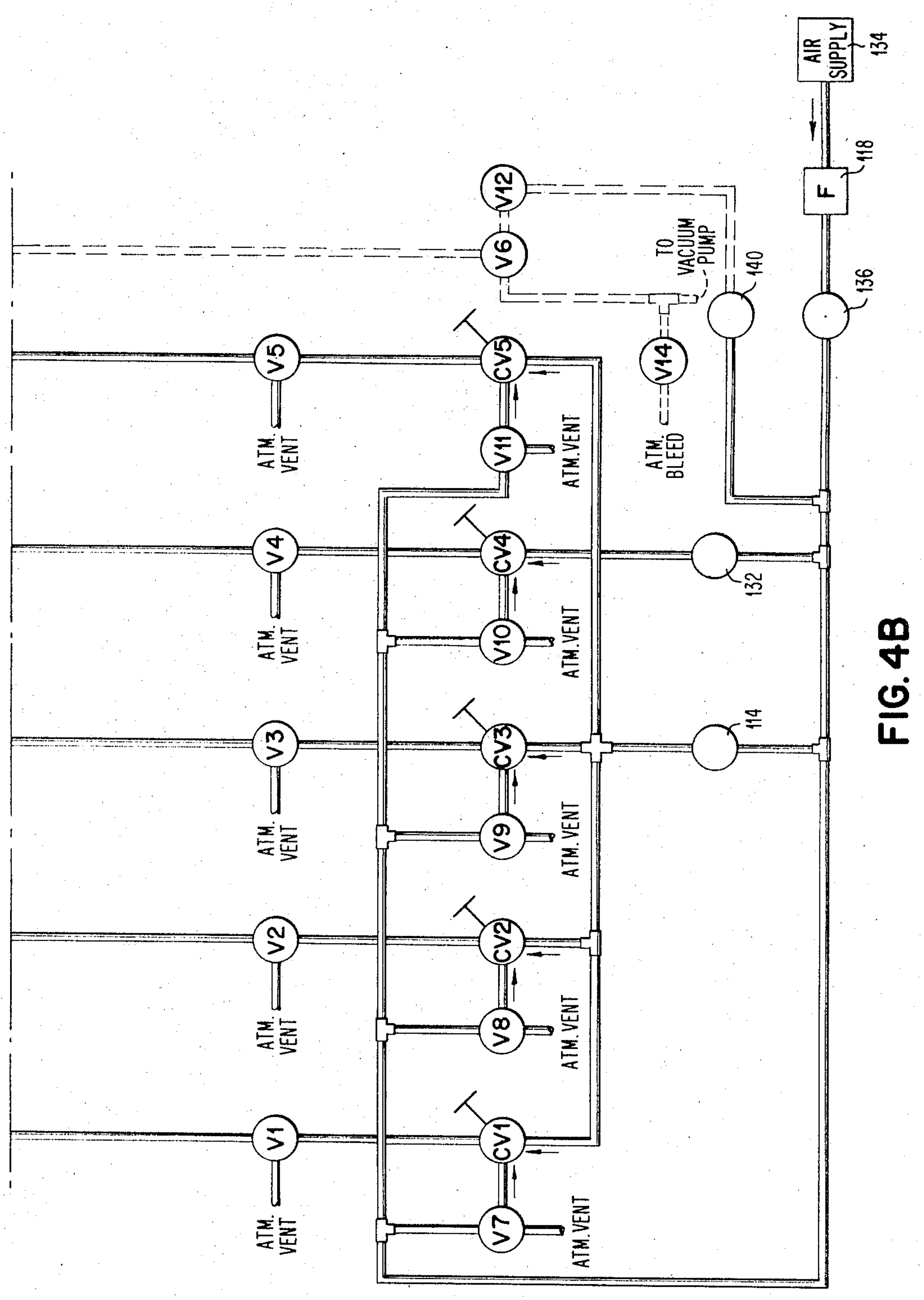
Figure 5:
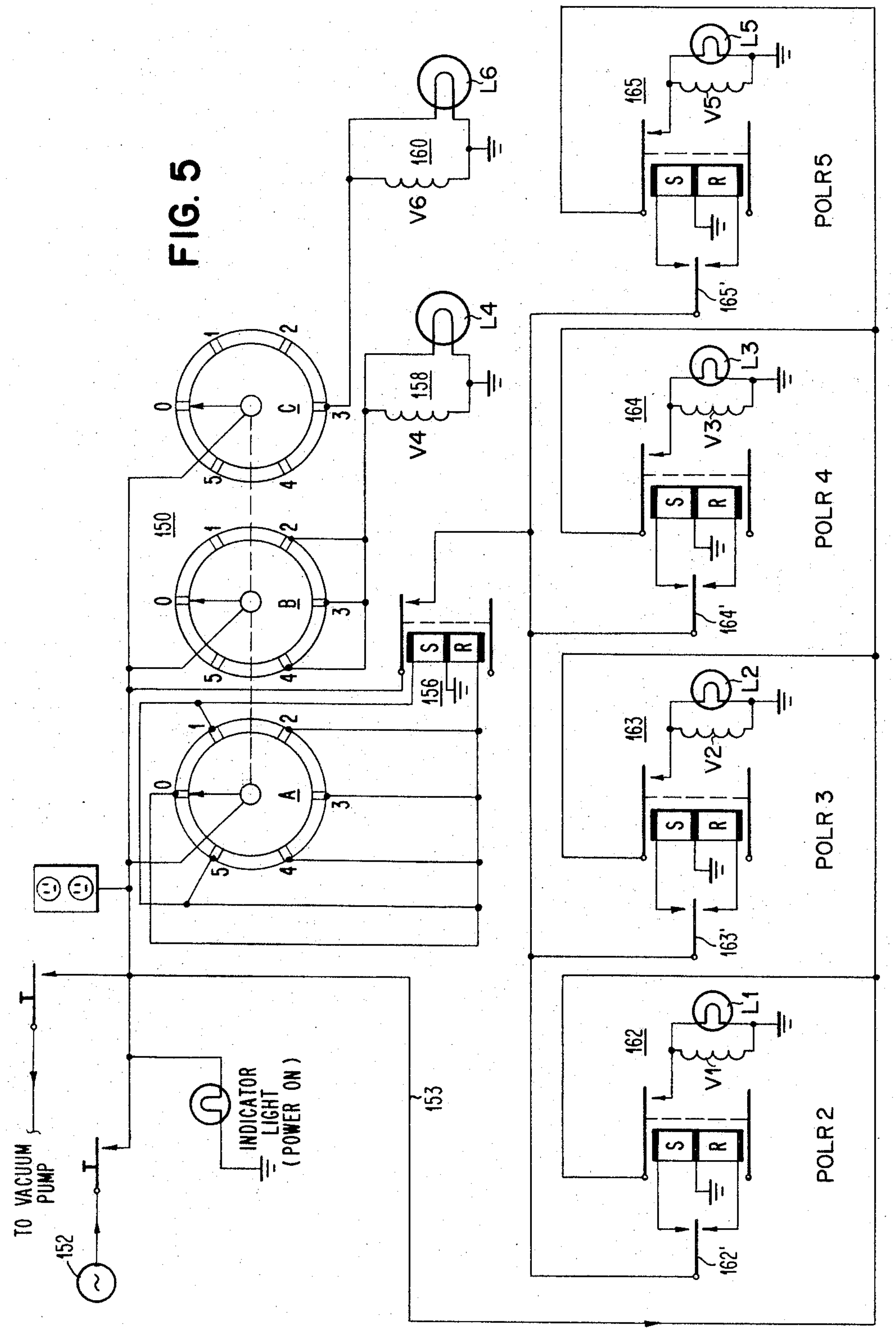
FIGURE 5 is an electrical schematic of the apparatus employed in the control of the pneumatic system.

The electrical circuit for operating the various solenoidal relays, described in conjunction with FIGURES 4A and 4B, is shown in FIGURE 5. A manually operated selector switch 150 includes sections A, B and C each with six discrete positions designated 0 through 5. The selector switch, in one form, is similar to that manufactured by Centralab, Electronics Division of Globe Union Inc. The selector switch 150 is supplied from a power supply 152 through a conventional single pole, single throw switch 154. The power supply is a conventional single phase 115 volt, 60 cycle source. The selector switch 150 controls a conventional pulse-operated latching relay 156 and solenoids 158, 160. Section A of the switch 150 controls the relay 156. Section B controls the solenoid 158 and section C of the switch 150 controls solenoid 160. The solenoids 158 and 160 are associated with solenoid control valves V4 and V6, respectively.

The switch 156 is a latching relay and adapted to assume a set or S and a reset or R condition. Positions 1 and 5 of section A are adapted to operate the set portion of relay 156. The remaining positions of section A are adapted to operate the reset portion of relay 156 which returns the relay to an open circuit condition. The set portion of relay 156 provides power to operate pulse-operated latching relays 162, 163, 164 and 165. Each of these relays has a set and reset condition controlled by a double throw, single pole, normally open switch 162′, 163′, 164′ and 165′. These switches are manually operated. Momentarily positioning the switches 162′ to 165′ in a set position, the relay 156 is in a set condition, will operate the set relay of the associated switches 162 to 165. The set operation will provide power from the source 152 through lead 153 to solenoid coils designated L1 through L5 for relays 162 through 165, respectively. The coils L1 through L5 are associated with air control valves V1, V2, V3 and V5, respectively. Hence, once the relay 162 . . . 165 is set, power is continuously applied to the associated solenoid coil to operate the valve associated with the solenoid coil. Momentarily closing any of the switches 162′ to 165′ to a reset position will remove the power to the solenoid coil. Thus, the valves V1 through V5 will be returned to their normal condition.

Section B of the switch 150 controls a solenoid L4 associated with valve V4. Positions 2, 3 and 4 of section B operate the solenoid L4 whereas positions 0, 1 and 5 decondition the solenoid.

Section C of the switch 150 controls the solenoid L6 associated with valve V6. Position 3 of section C energizes solenoid L6 whereas the remaining switch positions decondition the solenoid.

As the switch 150 is rotated through positions 0–5, the various valves V1 through V6 are operated or deconditioned. The valves V1, V2, V3 and V5 require manual operation of switches 162′ through 165′ to set or reset the disassociated valves. The valves V4 and V6 operate directly off the selector switch 150.

It should be noted that while the electrical schematic is semiautomatic in operation, it is readily within the skill of a worker in the art to arrange the circuit for full automatic operation. A selector switch can be provided which will automatically set and reset relays 162 through 165 for any particular sequence. The present circuit has been selected solely for reasons of convenience in explanation.

Operation of the multiple image photographic apparatus will now be described for fabricating a mask useful in the manufacture of a plurality of integrated circuits Before describing the manufacture of the mask, it is believed desirable to disclose how a mask is employed in fabricating semiconductor devices.

Turning to FIGURE 6, a semiconductor wafer 180 of an N-type conductivity is coated with an insulating film 182. The insulating film should adhere tightly to the semiconductor surface and prevent impurities from entering the wafer. For silicon type wafers, silicon dioxide has been found to be a good insulator. The film is grown in an oxidizing atmosphere or deposited by sputtering or like. FIGURE 6A shows a sectional view of one area in the oxide coated wafer 180.

The oxide coated wafer is coated with a developer or photoresist 184 in FIGURE 6B. A mask 186 is disposed between the wafer 180 and a light source 188. The mask is transparent except for a series of patterns uniformly disposed in discrete areas of the mask. A section of the wafer is shown in FIGURE 6C after the photoresist has been exposed and developed. The pattern is reproduced in the photoresist as shown in the sectional view. The silicon dioxide is exposed through the pattern as indicated in FIGURE 6C. An etchant is applied to the wafer to attack the silicon dioxide without any effect on the photoresist. The acid etches the silicon dioxide to expose a silicon surface. An impurity is diffused through the oxide opening to establish a change in conductivity type of the wafer, as indicated in FIGURE 6D. The wafer is then diced into individual units the size of the sectional view shown in FIGURE 6A. These devices are suitably mounted into a logical system capable of processing information at relatively high rate.

Operation of the multiple image camera will now be described in conjunction with FIGURE 7 which indicates the sequence of valve operations in fabricating a mask, and FIGURE 8 which shows the process steps. As a first step 190, shown in FIGURE 8, a lenticular lens is loaded into the camera beneath an emulsion-down photographic plate 60 (see FIGURE 2). The pressure plate, which holds down the photographic plate, is tightened into place by means of the bolt 64. An appropriate art work pattern 48 is loaded and registered on the light box 40. The wheel 56 is rotated to adjust the camera for the proper object distance. The switch 154 (see FIGURE 5) is closed to provide power to the solenoid valves V1 through V5, and to the sequence selector 150. The camera, operated in a dark room with the exception of a red light which does not affect the photographic plate sensitivity, is now ready to begin taking the first of four pictures.

The pattern photographed may be (1) divided into four sections and each individually photographed or (2) four different templates may be successively placed over a single pattern as each photograph is taken. For purposes of explanation, it is assumed that the pattern has been divided into four different sections and each section will be photographed.

The sequence switch 150 (FIGURE 5) is set in the 0 position whereby all of the pulse-operated relays are deconditioned. The sequence selector is rotated to position one, which prepares the camera for shifting the stepping plate to the first quadrant, as an operation 191, indicated in FIGURE 8. In position one, as shown in FIGURE 7, valves 1 and 2, shown in FIGURE 4B, are prepared for operation. Valve 6 is opened to the atmosphere. The valves V1 and V2 operate air cylinders 70X+ and 70Y−. The valves are operated by switches 162′ and 163′ (FIGURE 5) which are momentarily closed, by an operator, to operate the set coils of the relays 162 and 163, respectively. When valves V1 and V2, shown in FIGURE 4B, are operated, the air cylinders 70X+ and 70Y− are pushed against spacer bars 100X+ and 100Y−, shown in FIGURE 3A. The force of the air cylinder shafts on the spacer bars shifts the stepping plate into the first quadrant. The friction of the stepping plate relative to the upper plate and lower plate 76 and 95 (see FIGURE 3B) provide some small restraint to the movement. Additionally, the spacer bars 100Y+ and 100X− also provide some small restraint to movement of the spacer bar. However, the actual stopping of the stepping plate is done by the eccentric cams and rectangular blocks, with the precise stepping position determined by the elastic deformation of the eccentric cams; such deformation being determined by the curvature of the cam surface, the elastic modulus of the material, and the force applied by the air cylinders through the push bars and the stepping plate to the rectangular blocks. The X+ and Y− probes are read to determine the position of the optical axis of the lens system relative to the camera body.

In the event that the probes indicate less movement than the desired movement in the X+ and Y− directions, the overdrive air system is employed to move the stepping plate the necessary additional distance. The overdrive system is engaged by operating palm buttons (not shown) associated with manual control valves V7 and V8, shown in FIGURE 4A. The overdrive air is provided to valves V1 and V2 as required to drive the stepping plate to the final position to locate the optical axis in the center of the first quadrant of each unit cell. The excess air urges the air cylinders 70X+ and 70Y− against the push bars 100X+ and 100Y−. The push bars urge the guide blocks against the eccentrics 96 and 96′ which deform, as shown in FIGURE 3C. The deformation can be controlled to microinches in placing the stepping plate in the final quadrant position.

Figure 7:
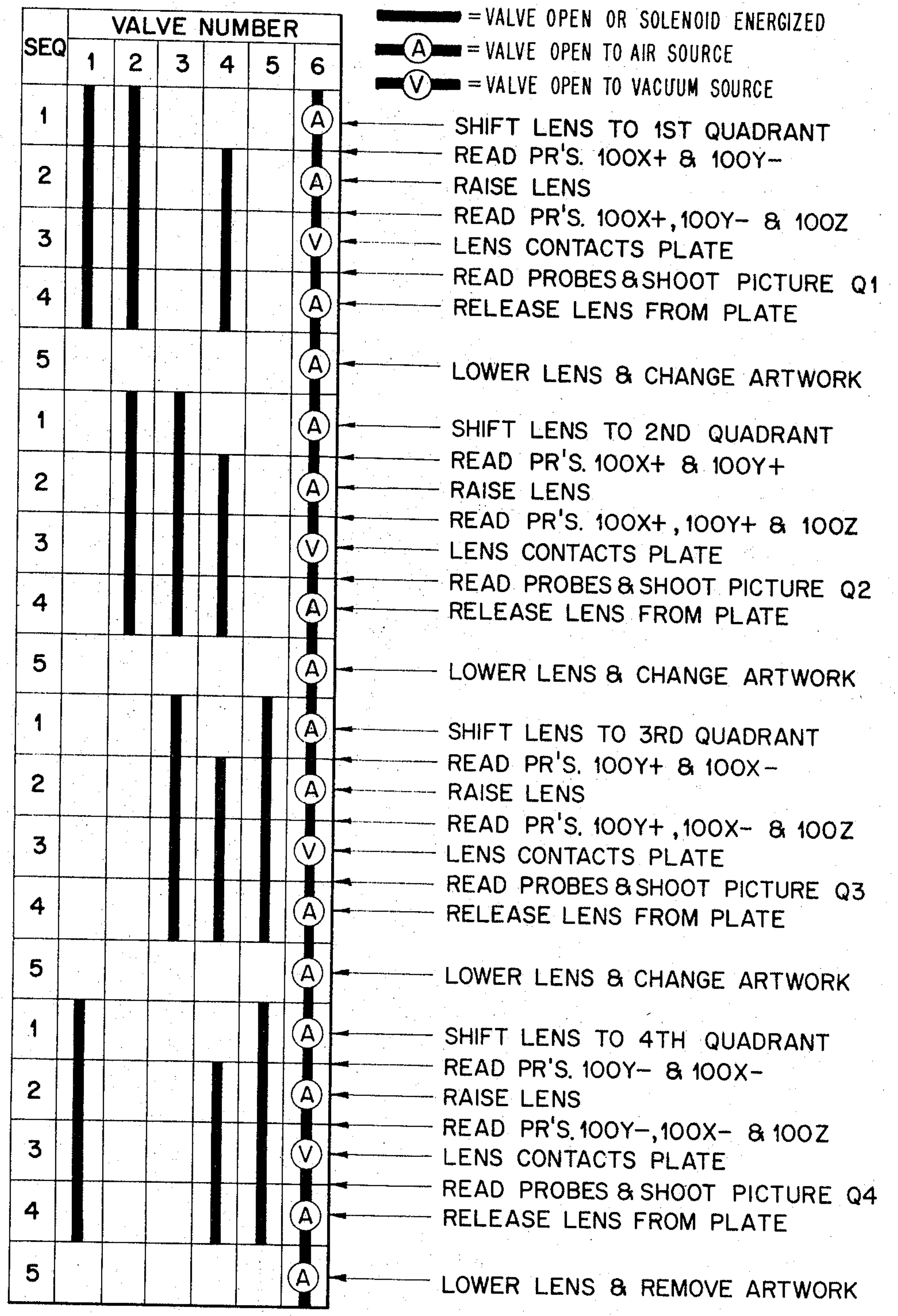
FIGURE 7 is a timing diagram for the operation of the pneumatic system.

Next, the sequence selector 150 is changed to position 2, as shown in FIGURE 7, to raise the lens towards the photographic plate. Position 2 retains valves 1 and 2 closed as well as valve 4 closed. Valve 4 (see FIGURE 5) is directly operated from the selector switch. Valve 4 provides air to the air cylinders 70Z to raise the stepping plate towards the photographic plate. The travel of the stepping plate is limited by the stop 90, as shown in FIGURE 3D. In travelling towards the photographic plate, the spring biased member 106, also shown in FIGURE 3C, is overcome.

The X, Y and Z probes are read to determine the position of the lenticular lens with respect to the photographic plate. The stop 90 holds the stepping plate approximately $1\times10^{-4}$ inches away from the photographic plate. The overdrive air for valve V4 is controlled by the valve V10, shown in FIGURE 4B. The valve V10 is operated in the event that additional displacement of the stepping plate is necessary. During this period, the valve V6, shown in FIGURE 4B, is opened to admit a slight air pressure of the order of 2–3 lb. in the vicinity of the lens and photograph plate. In this condition, the sequence selector is ready to be moved to the next or third position.

The third position of the sequence selector operates the valve V6 which applies a vacuum to the lens plenum (see FIGURE 4A). Valve V6 is directly operated off the C section of selector 150, shown in FIGURE 5. The vacuum brings the lens in contact with the plate at which point the light box is illuminated to expose the pattern 48 in the first quadrant of the individual lens in the lenticular array. The light box is illuminated for a preselected time interval by means of a conventional timer, not shown. The lens is released from the photograph plate at this point by rotating the selector switch 150 to the fourth position. The fourth position removes the vacuum from the lens plenum by closing the valve V6. The slight air pressure through valve V6 permits the lens to be separated again from the plate.

The selector is rotated to position 5 which provides power to switches 162 and 163. An operator momentarily sets switches 162′ and 163′ to the reset position which de-energizes solenoid L1 and L2, as shown in FIGURE 5. When the solenoids are de-energized, valves V1 and V2 are closed which removes the air pressure to air cylinders 70X+, 70Y+ and 70Z. The valves V1 and V2 include means to vent the pressure from the air cylinder.

To prevent damage to either the lens or the emulsion of the photographic plate, the stepping plate is always lowered a few thousandths of an inch whenever there is relative X—X or Y—Y motion between the lens and the plate. The stepping plate is lowered by its own weight, assisted by the action of the spring biased member 106, shown in FIGURE 4. With the stepping plate in the lowered position, new art work is disposed on the light table for the next photograph which will make up the mask. The photographic plate is not changed since only the first quadrant of each unit cell has been exposed.

As a next operation 192, the lens is shifted to the second quadrant through the operations of valves 2 and 3, as shown in FIGURE 7. These valves are operated through the switch 150 which is set in position 1 and an operator momentarily closes the switches 163′ and 164′ in the set position. The X and Y probes are read to establish the position of the stepping plate in the second quadrant. The overdrive system may be employed for precise movement of the stepping plate in the quadrant, if necessary. Manual valves V8 and V9 control the overdrive air for the valves V2 and V3, respectively. The lens is raised to engage a photograph plate by closing the valve V4. The valve V4 is closed by an operator changing the selector switch to position 2. The X, Y and Z probes are read to establish that the stepping plate is in its proper position. The vacuum is applied to the lens plenum by operating valve V6 which is followed by the picture taking of the art work on the light table. The valve V6 is operated when an operator changes the switch to position 3. The stepping plate is returned to the original position. The switch 150 is set in position 5 which deconditions all relays. An operator changes the switch 150 to position 4 and momentarily sets the switches 162′, 163′ and 164′ in the reset position. The art work is changed and the camera prepared for the next photograph. Again, the photographic plate is not changed. Operations 193 and 194 (FIGURE 8) for the third and fourth quadrants are next completed. After each sequence the art work is replaced. These operations are similar to that described for the operations 191 and 192 except that different X and Y air cylinders are operated. Each time the picture is taken the photograph plate is not changed. Further comment is not believed necessary in view of the preceding discussion.

The single photograph is developed. The negative is employed as the mask 186 (see FIGURE 6B). Each unit cell in the mask includes a series of patterns which are based on the art work or patterns successively photographed by the camera. It is believed apparent that the negative can be converted to a positive mask, if so desired. It is also apparent that a semiconductor wafer can be directly exposed in the camera after coating with a photoresist. This latter operation eliminates the necessity of preparing a mask.

It should also be noted that, while a lenticulated lens has been described, other refractive optical lenses are also suitable. Additionally, diffraction type optical devices are also satisfactory, as, for example, a Fresnel zone plate or a "pinhole" plate.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of fabricating an integrated circuit mask comprising the steps of
- loading a photographic plate into a multiple image camera,
- positioning the camera relative to a light source,
- disposing a pattern between the light source and the camera with said pattern corresponding to a portion of said circuit,
- shifting the camera lens relative to the photographic plate,
- energizing the light source to record the pattern in the photographic plate,
- changing the pattern to a second pattern corresponding to a second portion of said circuit,
- shifting the camera lens to a plurality of other positions relative to the photographic plate,
- energizing the light source at each lens position,
- changing said pattern to additional patterns defining corresponding additional portions of said circuit after each preceding pattern is recorded in the photographic plate when the light source is energized, with said change of pattern corresponding in number to the portions of said circuit required in said mask,
- developing the photographic plate, and
- employing said mask in a photolithographic process for defining in a semiconductor member the portions of said circuit defined in said mask.

2. A method of fabricating semiconductor devices comprising the steps of
- coating an insulated covered semiconductor member with a photosensitive material,
- loading the semiconductor member into a multiple image camera having a movable lens,
- positioning the camera relative to a light source,
- disposing a pattern between the light source and the camera,
- shifting the lens of the camera to a first position relative to the semiconductor member,
- energizing the light to record the pattern in the photosensitive material of the semiconductor member,
- changing the pattern,
- shifting the camera lens to a plurality of other positions relative to the semiconductor member,
- energizing the light at each of the positions,
- changing the pattern before the light is energized,
- removing the member from the camera,
- cleansing the member of the undeveloped photosensitive material,
- etching the semiconductor member in the area vacated by the removed photosensitive material, and
- diffusing through the etched area to change the conductivity of the semiconductor member.

3. A process for fabricating a multi-image mask for semiconductor processing of wafers containing a multiplicity of chip areas corresponding to the number of mask images, comprising:

projecting a pattern of a semiconductor circuit member through a fly's eye lens onto a photoresist coated mask element, including
- (A) positioning the axes of said lens to locate the area of resolution thereof on segments of said element corresponding to first portions of said chip areas;
- (B) photocopying said pattern on said element;
- (C) conjointly in optional sequence
  - (a) substituting another pattern of a semiconductor circuit member, and
  - (b) shifting the relative positions of said lens and the optical axes of said element to locate the areas of resolution thereof on segments of said element corresponding to another portion of said chip areas;
- (D) photocopying said additional patterns on said element; and
- (E) repeating steps C and D until the desired number of patterns are recorded on respective segments of said element corresponding to predetermined portions of said chip areas.

4. A process for fabricating a multi-image mask for semiconductor processing of wafers containing a multiplicity of chip areas corresponding to the number of mask images, comprising:

projecting a pattern of a semiconductor circuit member through a fly's eye lens onto a photoresist coated mask element, including
- (A) positioning the axes of said lens to locate the areas of resolution thereof on segments of said element corresponding to first portions of said chip areas;
- (B) photocopying said pattern on said element;
- (C) conjointly in optional sequence
  - (a) substituting another pattern of a semiconductor circuit member, and
  - (b) shifting the optical axes of said lens to locate the areas of resolution thereof on segments of said element corresponding to other portions of said chip areas;
- (D) photocopying said additional patterns on said element; and
- (E) repeating steps C and D until the desired number of patterns are recorded on respective segments of said element corresponding to predetermined portions of said chip areas.

5. A process for fabricating a multi-image mask for semiconductor processing of wafers containing a multiplicity of chip areas corresponding to the number of mask images, comprising:

projecting a pattern of a semiconductor circuit member through a fly's eye lens onto a photoresist coated mask element, including
- (A) positioning the axes of said elements to locate the areas of resolution thereof on sections of said element corresponding to a first quadrant of said chip areas;
- (B) photocopying said pattern on said elements;
- (C) conjointly in optional sequence
  - (a) substituting another pattern of a semiconductor circuit member, and
  - (b) shifting the relative position of said element and the optical axes of said lens to locate the areas of resolution thereof in another quadrant of said chip area;
- (D) photocopying said additional patterns on said element; and
- (E) repeating steps C and D until the desired number of patterns are recorded on respective sections of said element corresponding to predetermined quadrants of said chip area.

6. A process for fabricating a multi-image mask for semiconductor processing of wafers containing a multiplicity of chip areas corresponding to the number of mask images, comprising:

projecting a pattern of a semiconductor circuit member through a fly's eye lens onto a photoresist coated mask element, including (A) positioning the axes of said lens to locate the areas of resolution thereof on segments of said element corresponding to a first quadrant of said chip area;

(B) photocopying said pattern on said elements;

(C) conjointly in optional sequence (a) substituting another pattern of a semiconductor circuit member, and (b) shifting the optical axes of said lens to locate the areas of resolution thereof on portions of said element corresponding to another quadrant of said chip area;

(D) photocopying said additional pattern on said elements; and (E) repeating steps C and D until the desired number of patterns are recorded on respective segments of said element corresponding to predetermined quadrants of said chip area.

References Cited

UNITED STATES PATENTS

| | | | |
|---|---|---|---|
| 1,662,304 | 3/1928 | Doogood | 95—37 |
| 1,668,592 | 5/1928 | Huebner | 33—184.5 |
| 2,140,602 | 12/1938 | Simjian | 95—82 |
| 2,185,508 | 1/1940 | Kunze | 95—1.1 |
| 3,247,761 | 4/1966 | Herreman | 88—24 |
| 1,097,013 | 5/1914 | Genter | 95—38 X |
| 2,515,862 | 7/1950 | Carlton. | |
| 2,715,862 | 8/1955 | Moyroud | 95—4.5 |

FOREIGN PATENTS

| | | |
|---|---|---|
| 72,736 | 6/1916 | Switzerland. |

JOHN M. HORAN, *Primary Examiner.*

U.S. Cl. X.R.

95—18, 37, 38